US006861251B2

(12) United States Patent
Green

(10) Patent No.: US 6,861,251 B2
(45) Date of Patent: Mar. 1, 2005

(54) TRANSLUCENT SOLID MATRIX ASSAY DEVICE FOR MICROARRAY ANALYSIS

(75) Inventor: Lawrence R. Green, Tacoma, WA (US)

(73) Assignee: PriTest, Inc., Redmond, WA (US)

( * ) Notice: Subject to any disclaimer, the term of this patent is extended or adjusted under 35 U.S.C. 154(b) by 0 days.

(21) Appl. No.: 10/373,546

(22) Filed: Feb. 24, 2003

(65) Prior Publication Data

US 2004/0166494 A1 Aug. 26, 2004

(51) Int. Cl.$^7$ ............................................... C12M 1/34
(52) U.S. Cl. .................... 435/287.2; 435/6; 435/7.1; 435/7.2; 435/288.7; 436/527; 436/530; 356/317
(58) Field of Search ............................ 422/50, 56, 57, 422/82.06–7, 100; 435/6, 69.1, 91.2, 174, 177, 287.1; 436/172, 180, 160

(56) References Cited

U.S. PATENT DOCUMENTS

| | | | | |
|---|---|---|---|---|
| 3,985,691 A | * | 10/1976 | De Taffin et al. ............ | 524/716 |
| 4,031,172 A | * | 6/1977 | Zeigler ........................ | 264/3.3 |
| 5,128,528 A | | 7/1992 | Heninger | |
| 5,270,163 A | | 12/1993 | Gold et al. | |
| 5,281,540 A | * | 1/1994 | Merkh et al. ................ | 436/530 |
| 5,370,842 A | | 12/1994 | Miyazaki et al. | |
| 5,401,511 A | | 3/1995 | Margalit | |
| 5,414,258 A | | 5/1995 | Liang | |
| 5,486,452 A | * | 1/1996 | Gordon et al. ................. | 435/5 |
| 5,512,492 A | | 4/1996 | Herron et al. | |
| 5,567,588 A | | 10/1996 | Gold et al. | |
| 5,603,872 A | | 2/1997 | Margalit | |
| 5,608,225 A | | 3/1997 | Kamimura et al. | |
| 5,633,487 A | | 5/1997 | Schmutz et al. | |
| 5,670,637 A | | 9/1997 | Gold et al. | |
| 5,696,249 A | | 12/1997 | Gold et al. | |
| 5,779,978 A | | 7/1998 | Hartmann et al. | |
| 5,807,522 A | * | 9/1998 | Brown et al. .................. | 422/50 |
| 5,827,748 A | | 10/1998 | Golden | |
| 5,831,012 A | | 11/1998 | Nilsson et al. | |
| 5,843,653 A | | 12/1998 | Gold et al. | |
| 5,880,176 A | | 3/1999 | Kamoto et al. | |
| 5,889,155 A | | 3/1999 | Ashkenazi et al. | |
| 5,922,593 A | | 7/1999 | Livingston | |
| 5,956,447 A | | 9/1999 | Zel'Dovich et al. | |
| 6,017,742 A | * | 1/2000 | Takenishi et al. ............ | 435/180 |
| 6,192,168 B1 | | 2/2001 | Feldstein et al. | |
| 6,242,267 B1 | | 6/2001 | Herron et al. | |
| 6,289,144 B1 | | 9/2001 | Neuschäfer et al. | |
| 6,296,189 B1 | | 10/2001 | Lawandy et al. | |
| 6,331,438 B1 | * | 12/2001 | Aylott et al. ................. | 436/172 |
| 6,353,479 B1 | | 3/2002 | Lubawy et al. | |
| 6,649,416 B1 | * | 11/2003 | Kauer et al. ................. | 436/164 |
| 2003/0112446 A1 | * | 6/2003 | Miller et al. ................. | 356/504 |
| 2003/0228637 A1 | * | 12/2003 | Wang ........................... | 435/7.9 |

OTHER PUBLICATIONS

Kodak Research and Development, CMOS vs CCD and the future of imaging, Apr. 2001, CMOS, 1–4.*

(List continued on next page.)

*Primary Examiner*—Long V. Le
*Assistant Examiner*—Nelson Yang
(74) *Attorney, Agent, or Firm*—Richard A. Nakashima; Faegre & Benson LLP

(57) ABSTRACT

The present invention concerns methods and compositions relating to matrix arrays. In certain embodiments, the arrays are translucent. In other embodiments, the arrays are reconfigurable. In preferred embodiments, the arrays are translucent and reconfigurable. Reconfigurable arrays may be produced using small linker molecules, such as aptamers or affibodies, attached to the array substrate. Preferably, the small linker molecules bind to an IgG specific portion of antibodies. Such arrays may be used to detect any target that binds selectively or specifically to an IgG, allowing great flexibility of use. Translucent matrix arrays may utilize a translucent, colloidal form of nitrocellulose to coat the array substrate.

17 Claims, 1 Drawing Sheet

OTHER PUBLICATIONS

Brush, "The Fast Lane," *The Scientist*, 14[9]:21, 2000.

Constans, "PIP, PIP, Hooray!," *The Scientist*, 16:28, 2002.

Jones, "Troubleshooting Protein Binding in Nitrocellulose Membranes, Part 1: Principles," *IVD Technology*. Retrieved Aug. 25, 2003, from the Internet: www.devicelink.com/ivdt/archive/99/03/009.html.

Jones, "Troubleshooting Protein Binding in Nitrocellulose Membranes, Part 2: Common Problems," *IVD Technology*. Retrieved Aug. 25, 2003 from the Internet: http://www.devicelink.com/ivdt/archive/99/05/002.html.

Stolowitz, et al., "Phenylboronic Acid–Salicyhydroxamic Acid Biconjugates. 1. A novel Boronic Acid Complex for Protein Immobilization," *Bioconjugate Chem.*12:229–239, 2001.

PCT Search Report, PCT/US02/32359, dated Oct. 9, 2002.

Tonkinson, et al., "Nitrocellulose: A Tried and True Polymer Finds Utility as a Post–Genomic Substrate," *Frontiers in Bioscience* 7:cl–12, 2002, 22 pages.

\* cited by examiner

Signal ($S_{ref}$) = Primary Scatter ($S_p$)

Signal ($S_2$) = modified ($S_p$) + $M_2$

Signal ($S_3$) = modified ($S_2$) + $M_3$ + Emission

TRANSLUCENT SOLID MATRIX ASSAY DEVICE FOR MICROARRAY ANALYSIS

BACKGROUND OF THE INVENTION

1. Field of the Invention

The present invention relates to the field of microarray analysis. More particularly, the present invention concerns methods, compositions and apparatus relating to translucent, solid, two-dimensional (2D) matrix assay devices for microarray analysis. In certain embodiments of the invention, the microarray may be a reconfigurable microarray.

2. Description of Related Art

Microarray analysis involves the attachment of capture molecules, such as antibodies or oligonucleotides, to a solid matrix. Typically, the array is designed so that capture molecules specific for particular target analytes are attached to identifiable locations on the matrix. After exposure to a sample suspected of containing one or more target analytes, the matrix is analyzed to determine if substances in the sample bind to the capture molecules at one or more locations on the array.

Two-dimensional microarrays have proven useful for a wide range of applications, such as genomic research. Arrays of oligonucleotide probes may be used to determine the match or mismatch for a given sample of DNA or RNA, as in the detection of disease-associated single nucleotide polymorphisms (SNPs). Gene expression-profiling with microarrays containing probes against target gene mRNAs has been used to identify genes that are up- or down-regulated in response to disease, drug treatment, developmental stage and other conditions. Microarrays have also been of use for applications in protein research. However, proteins are more difficult to attach to a solid matrix and far more complex than oligonucleotides. Thus, techniques for use with protein (antibody) microarrays often require modifications compared to the more simple nucleic acid microarrays. (See, e.g., Constans, *The Scientist*, 16:28, 2002.)

Many clinical diagnostic devices have been built around microarray platforms incorporating an appropriate solid matrix. These often contain capture molecules that have been printed or otherwise permanently affixed to the matrix. One of the problems with such fixed arrays is that they are static. Once an array has been printed, it cannot be changed or adapted to conduct any tests other than the ones that it was originally designed for. A reconfigurable microarray would be very advantageous in allowing flexibility of use.

Existing microarrays face additional problems. For example, the type of solid matrix used may affect the results obtained, depending on the method of analysis and the materials used. Most microarrays are produced using covalent, electrostatic or hydrophobic binding to attach capture probes to the surface of a solid matrix. The capture probes remain attached to the surface during sample analysis. Bound target molecules may be detected in a variety of ways. Most commonly, one or more fluorophore tags are attached to the target molecules or cells that are to be bound by a capture molecule. Once binding is complete the tags may be spectrophotometrically detected. Scanners, CCD cameras or similar detectors may be used to determine the location and signal intensity of fluorescent tags bound to matrix arrays.

The amount of probe material that can be affixed on a matrix surface depends on the composition of the solid matrix. If insufficient amounts of probe are affixed to the matrix, the resulting fluorescent signal will be so weak that it cannot be detected even if the probe captures a tagged target molecule. It is also not sufficient to bind high concentrations of probe molecules to the surface of a solid matrix, if the matrix does not provide sufficient conformational or steric freedom to allow probes to bind to target molecules.

The solid matrix must also preserve the functional activity of the probe. Proteins, such as antibodies, attached to a solid matrix may undergo denaturation over time, rendering antibodies inactive or enzymes dysfunctional. In such cases, the signal strength (and the amount of target protein identified in a sample) may vary by the length of time following matrix array manufacture. Although such time-dependent processes may be compensated for in part by the use of external standard proteins, the denaturation rates for different antibodies or enzymes affixed to the same matrix may not be identical.

Other characteristics of the solid matrix used for 2D arrays may also be important. For example, the opacity of the solid matrix may render it useless for certain kinds of analysis. Opaque materials only allow sample analysis to occur on the same side of the solid matrix as the probe array. This prevents the use of see-through optics that detect light from the opposite side of the matrix. For example, a matrix array may be opposed to a fluidic cube or other fluidic device, with probe molecules attached to the array within a cavity formed by the fluidics cube. Detection of real-time binding of target molecules to the probes would be greatly facilitated if emitted light could be detected from the opposite surface of the array. This is not feasible if the array is opaque to the emitted light.

A need exists for a translucent solid matrix that could be used with a fluidic cube or other flow device. Such translucent matrix materials should also allow for binding of high concentrations of probe molecules, while maintaining probe molecules in an active state.

SUMMARY OF THE INVENTION

The present invention resolves a long-standing need in the art by providing compositions for and methods of production and use of translucent solid 2D matrix arrays. In certain embodiments of the invention, the matrix arrays are microarrays, with binding molecule spots of between 1 $\mu$m and 999 $\mu$m in size. In particular embodiments, the spots may be between 100 and 500 $\mu$m in size. More particularly, the spots may be about 300 $\mu$m in size. In specific embodiments, the microarrays may be reconfigurable. Exemplary microarrays of potential use in the claimed methods are disclosed, for example in U.S. patent application Ser. No. 10/035,367, filed Dec. 28, 2001, the entire contents of which are incorporated herein by reference.

In various embodiments of the invention, the solid matrix arrays may exhibit one or more of the following characteristics: [1] inexpensive to produce; [2] long term stability (retain characteristic features over time); [3] ease of manufacture; [4] reproducible target molecule detection and/or quantification between lots; [5] bind high levels of probes; [6] do not interfere with probe functionality (e.g., binding affinity for target molecules); [7] translucent; and [8] do not interfere with probe-target molecule interaction. Such characteristics of the disclosed solid matrix arrays are advantageous compared to previously known solid matrix arrays.

Certain embodiments of the invention concern efficient methods for producing a translucent (optically clear) nitrocellulose matrix supported on a solid substrate. Such translucent matrices are ideally suited for 2D microarray analysis. The translucent nitrocellulose matrix preserves protein (antibody) functionality and exhibits many of the characteristics listed above, such as high binding capacity. The translucent nitrocellulose solid matrix is suitable for genomic and proteomic work and can be used in a variety of diagnostic formats. Because it is translucent, it is suitable for use with see-through optics that detect light from the opposite side of the matrix from the capture molecules. A non-limiting example of a fluidics cube type biosensor of use with the claimed methods and compositions is disclosed in U.S. patent application Ser. No. 09/974,089, filed Oct. 1, 2001, the entire contents of which are incorporated herein by reference.

Other embodiments of the invention concern methods for producing a translucent, optically clear signal using small linker molecules bound to the surface of a solid matrix substrate. Aptamers, affibodies (e.g. U.S. Pat. No. 5,831,012), or other linkers that exhibit a high affinity for the Fc portion of certain antibodies may be used to attach antibodies or antibody fragments to a solid matrix. The use of such linkers overcomes the tendency for the solid matrix to display a lower binding capacity for larger molecules (e.g., antibodies). The methods may be used in combination with optically clear nitrocellulose matrix substrates to create reconfigurable microarrays. Alternatively, the methods may be used with traditional translucent substrates such as glass microscope slides.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Definitions

Figure 1:
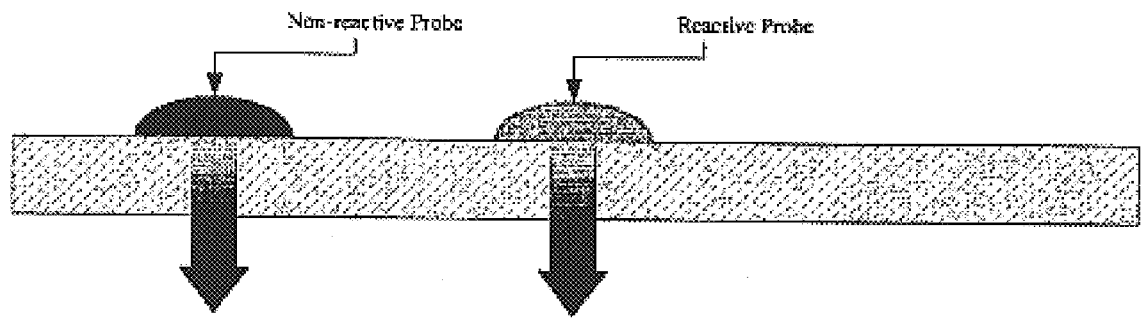
FIG. 1 illustrates an exemplary embodiment of translucent matrix array.
Figure 1:
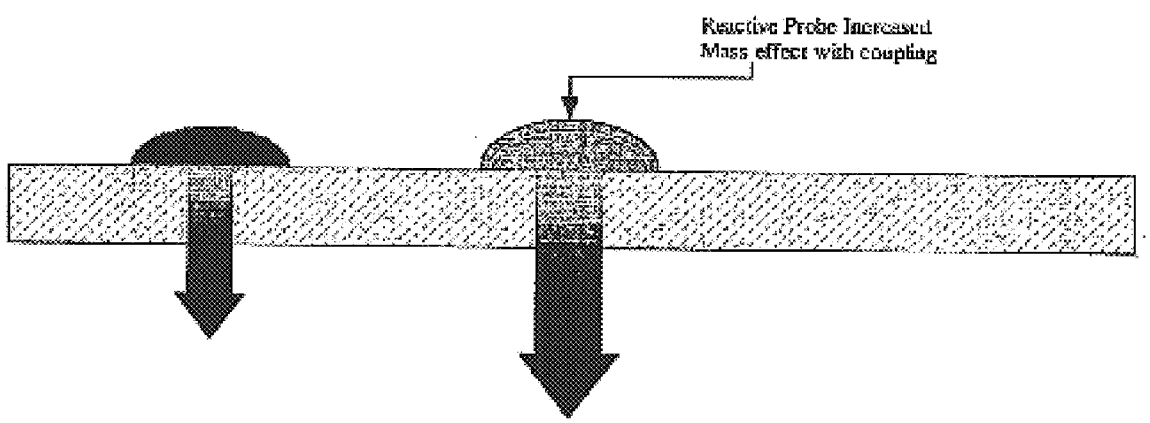
Figure 1:
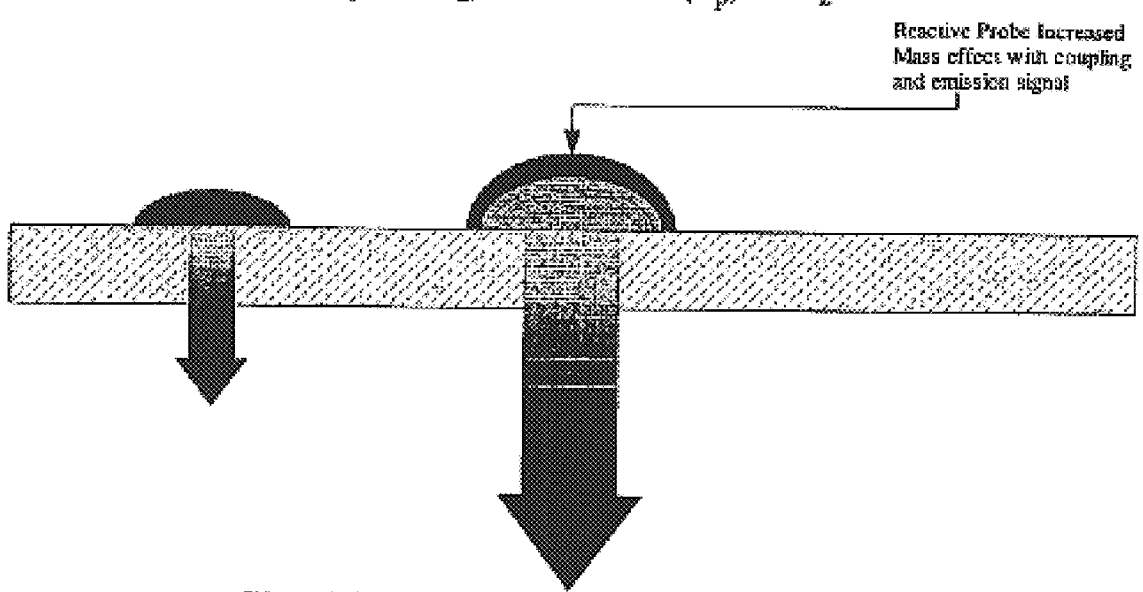

Terms that are not otherwise defined herein are used in accordance with their plain and ordinary meaning.

As used herein, "a" or "an" may mean one or more than one of an item.

As used herein, the terms "analyte" and "target" mean any compound, molecule or aggregate of interest for detection. Non-limiting examples of targets include a protein, peptide, carbohydrate, polysaccharide, glycoprotein, lipid, hormone, growth factor, cytokine, receptor, antigen, allergen, antibody, substrate, metabolite, cofactor, inhibitor, drug, pharmaceutical, nutrient, toxin, poison, explosive, pesticide, chemical warfare agent, biowarfare agent, biohazardous agent, infectious agent, prion, radioisotope, vitamin, heterocyclic aromatic compound, carcinogen, mutagen, narcotic, amphetamine, barbiturate, hallucinogen, waste product, contaminant, heavy metal or any other molecule or atom, without limitation as to size. "Targets" are not limited to single molecules or atoms, but may also comprise complex aggregates, such as a virus, bacterium, *Salmonella, Streptococcus, Legionella, E. coli, Giardia, Cryptosporidium, Rickettsia*, spore, mold, yeast, algae, amoebae, dinoflagellate, unicellular organism, pathogen or cell. In certain embodiments, cells exhibiting a particular characteristic or disease state, such as a cancer cell, may be targets. Virtually any chemical or biological compound, molecule or aggregate could be a target.

As used herein, "capture molecule" and "probe" refer to a molecule or aggregate that has binding affinity for one or more targets. Within the scope of the present invention virtually any molecule or aggregate that has a binding affinity for some target of interest may be a "capture molecule." "Capture molecules" include, but are not limited to, polyclonal antibodies, monoclonal antibodies, antibody fragments, FAb fragments, humanized antibodies, single-chain antibodies, chimeric antibodies, affibodies, oligonucleotides, polynucleotides, nucleic acids, aptamers, nucleic acid ligands and any other known ligand that can bind to at least one target molecule. In certain embodiments, the capture molecule is specific for binding to a single target, although in other embodiments the capture molecule may bind to multiple targets that exhibit similar structures or binding domains.

"Binding" refers to an interaction between a target and a capture molecule, resulting in a sufficiently stable complex so as to permit detection of the target:capture molecule complex. In certain embodiments, binding may also refer to an interaction between a second molecule and a target. For example, in a sandwich ELISA type of detection assay, the capture molecule is an antibody with affinity for a target. After binding of target to capture molecule, a second molecule, typically a tagged antibody with an affinity for a different epitope of the target, is added and the tertiary complex of first antibody:target:second tagged antibody is detected. In alternative embodiments, the first capture molecule may have affinity for a target while the second capture molecule has affinity for the first capture molecule. Although detection may involve the use of a second capture molecule with affinity for a target, in alternative embodiments the binary complex of capture molecule with target may be directly detected. The skilled artisan will be familiar with a variety of techniques by which a target:capture molecule complex may be detected, any of which may be utilized within the scope of the present invention.

The terms "detection" and "detecting" are used herein to refer to an assay or procedure that is indicative of the presence of one or more specific targets in a sample, or that predicts a disease state or a medical or environmental condition associated with the presence of one or more specific targets in a sample. It will be appreciated by those of skill in the art that all assays exhibit a certain level of false positives and false negatives. Even where a positive result in an assay is not invariably associated with the presence of a target, the result is of use as it indicates the need for more careful monitoring of an individual, a population, or an environmental site. An assay is diagnostic of a disease state or a medical or environmental condition when the assay results show a statistically significant association or correlation with the ultimate manifestation of the disease or condition.

Traditional Translucent Slides

Glass or plastic microscope slides have commonly been used as solid matrix supports for microarray analysis. Probe molecules have been attached to glass or plastic surfaces using cross-linking compounds. (See, e.g., Schena, Microarray Analysis, J. Wiley & Sons, New York, N.Y., 648 pp., 2002.) Probes may be printed as 2D arrays of spots, each of about 100 to 500 µm in diameter. The cross-linking compounds and any coating used to attach probes to the glass surface form a solid matrix, on top of the glass substrate. Many different kinds of cross-linkers are known, depending on the type of reactive moieties (e.g., sulfhydryl, amino, carboxyl, phenyl, hydroxyl, aldehyde, etc.) available on the probe molecules that can be cross-linked to the surface without affecting probe functionality (e.g., target molecule binding).

A problem with previous methods for probe attachment is that the capacity for attachment is limited. As probe size is increased, the number of possible binding sites for prospective target molecules is generally decreased. If the binding sites for the probe are saturated at a level below the threshold for detection, a signal will not be observed even if binding has occurred between probe and target molecule.

Attempts have been made to attach probes to the glass surface using avidin-coated slides and biotin-conjugated probe molecules. Alternatively, silanes, such as aminosilane or 3-glycidoxypropyltrimethoxysilane, have been coated onto the glass surface, with the silane moiety attached to the glass and the reactive moiety cross-linked to probe molecules. Other approaches have utilized slides coated with reactive substrates with functional aldehyde, carboxyl, epoxy, or amine groups that can form a covalent bond with the probe molecules, affixing them permanently to the glass surface.

Although these methods work moderately well for small probe molecules, they tend to work poorly for larger probe molecules (e.g., antibodies) where functionality (binding) may depend on probe orientation, flexibility and degree of cross-linking. Covalent attachment methods also tend to bind very little material to the matrix surface. Consequently, probe concentration is low and signal detection is difficult. Because relatively little probe is available on the surface of the 2D array, such systems show a low signal-to-noise ratio for a positive binding reaction between probe and target.

Protein or peptide target molecules are often detected using antibodies as capture molecules. Two-dimensional arrays used in clinical diagnostics or proteomics frequently utilize antibodies as probes for protein or peptide target molecules. Although antibodies tend to be highly specific for their target antigens, they are not easily attached to glass surfaces with cross-linking agents and standard methods. This is because of the limited amount of material that can be affixed to the matrix with known chemistries, resulting in weak signals generated upon target binding. Another problem is that antibody specific binding cannot be maintained without adequate hydration and support in the matrix. Thus, long term stability of antibody-coupled solid matrix arrays tends to be limited, with inconsistent results obtained depending on the age of the array.

Attempts have been made to solve this problem by creating an environment that stabilizes the protein and preserves its functional probe features. For example, Prolinx Inc. (Bothell, Wash.) has developed a chemical affinity system using standard glass slides with a polymer brush format affixed to their surface. The system relies upon the interaction between two synthetic small molecules that form a stable complex, phenyldiboronic acid (PDBA) and salicylhydroxamic acid (SHA). (E.g., Stolowitz et al., *Biocon-jugate Chem.* 12:229–239, 2001.) PDBA is first conjugated with protein probes. The conjugated probes then link to SHA attached to the polymer brush to form a 3D functional array. This method is limited by the amount of antibody that can be bound to the surface. More importantly, the target antigen must be sufficiently small to diffuse through the brush border in order to react with antibodies affixed to the matrix. Such methods are not suitable for identifying and/or quantifying larger targets, such as whole cells or bacteria.

Opaque Slides

Methods to stabilize and increase the amount of probe attached to matrix arrays are highly desirable. Such methods generally lead to opaque slides, since the matrix materials used to increase probe binding and preserve stability typically involve non-translucent gels, hydro-gels, agars, and other materials coated on the glass surface. Proteins attached to such opaque matrix materials are stabilized by hydrophobic and electrostatic interactions in a three-dimensional array.

Most scanners in current use for genomic and proteomic microarrays read the slides from the same side as the bound probe and target molecules, using opaque matrix arrays. Opaque matrix-coating materials used to produce microarrays include nylon, PVDF (polyvinylidene fluoride) and nitrocellulose. Nitrocellulose, a traditional polymer substrate in use for more than 50 years, is a substrate with very attractive properties for microarray applications. (E.g., Tonkinson and Stillman, *Frontiers in Bioscience* 7:c1–12, 2002.)

Opaque nitrocellulose has been extensively used to immobilize proteins and nucleic acids for biomolecular analysis. Nitrocellulose immobilizes molecules of interest in near quantitative fashion and allows for short and long term storage. Nitrocellulose also allows for solution phase target species to efficiently bind to immobilized capture molecules. Diagnostic devices using ELISA methods have employed nitrocellulose membranes with a lateral flow process to bind capture reagents to the membrane (Jones, *IVD Technology*, 5(2):32, 1999).

Traditional opaque membrane materials have a number of attractive features. They are inexpensive to construct, bind more than 100 times the amount of protein that can be bound by linker coated glass slides, and are generally easy to work with. This is particularly true for opaque nitrocellulose membranes, which have a long history of use.

Nitrocellulose is normally produced in a microporous form that may be applied to the surface of glass slides to form an opaque surface. Probes may then be attached to the opaque nitrocellulose membranes in microarrays, using standard nitrocellulose binding methods. Such slides have been used with radioactive, fluorescent and chemiluminescent detection systems (e.g., Brush, The Scientist 14[9]:21, 2000).

Traditional nitrocellulose membranes are also very brittle in the absence of a supporting structure or foundation, leading to frequent cracking or fragmentation. For this reason, opaque nitrocellulose has been used in a microporous form bound to plastic sheets. Such sheets are always opaque, due to the microporous form, and require a supporting structure (e.g. acetate or cellulose) to avoid damage during handling.

Although opaque nitrocellulose membranes exhibit high binding capacity, stability and reasonably low interference with target-capture molecule interactions, they are not suitable for use with optical detection systems designed to work from the opposite side of a matrix array.

Translucent Nitrocellulose Slides

The methods and compositions disclosed herein may be used to produce translucent surface coatings of colloidal nitrocellulose that retain advantageous binding characteristics of opaque nitrocellulose membranes. The interaction between probe and target molecules can be observed directly on a translucent nitrocellulose solid matrix.

In some embodiments of the invention, translucent nitrocellulose matrix arrays may be used in combination with a flow cell, fluidics cube or capillary system (e.g., U.S. patent application Ser. No. 09/974,089). In such embodiments, the translucent nitrocellulose matrix may be attached to one side of a glass or plastic slide. Probes may be attached to the nitrocellulose and the interaction between probe and target molecules observed through the glass with a sensor or camera.

The nitrocellulose material is totally translucent if formed according to the disclosed methods. Light signals may thus be observed without scatter or interference from opaque materials. This allows a greater signal-to-noise ratio and ease of detection of target molecules, compared to opaque microporous nitrocellulose matrix arrays. Such opaque matrix arrays can obscure portions of the light or reaction indicator species (e.g., dye) produced upon binding of target molecules.

Nitrocellulose in the form of a colloid in an amyl acetate solvent has been used by electron microscopists to make castings for specimens. Colloidal nitrocellulose is formed by casting as an ultra-thin film on a water surface. The film may then be picked up on a transmission electron microscopy (TEM) grid and used as a support film for TEM specimens. Because the film must be very clean and uniform, great care is exercised in its production. Colloidal nitrocellulose is readily soluble in amyl acetate. The amyl acetate is water soluble and evaporates evenly to form uniform films. It is supplied as a 1% solution of very pure nitrocellulose.

High purity nitrocellulose in EM grade amyl acetate (Collodion) may be purchased from commercial sources. The amyl acetate is purified by refluxing over calcium oxide to remove all moisture. Soluble and suspended material is removed by slow distillation. The removal of all traces of moisture from the solvent permits the formation of very strong colloidal nitrocellulose films with virtually no holes.

In an exemplary embodiment of the invention, Collodion was obtained in bulk from Ernest F Fullam, Inc. (Latham, N.Y.) and used to manufacture high quality translucent nitrocellulose matrix arrays. An aliquot of 200 µL of 1% Collodion solution was pipetted onto the surface of freshly cleaned standard 25×75 mm glass slides. The Collodion was evenly spread to the edges of the glass slide surface in a dust free area. After drying for 2 hours at room temperature, the slides were heated for an additional hour or more at approximately 60° C. Dried slides were labeled and stored for production of microarrays.

When using a glass array surface, the edges of each slide were sealed with lacquer (e.g. nail polish) or other adhesive to prevent the ultra-thin nitrocellulose substrate from separating from the glass upon exposure to aqueous solutions. When colloidal nitrocellulose is applied to acetate film or other plastic surfaces, it requires no adhesive and binds avidly. Slides may be composed of almost any translucent material as long as the amyl acetate does not react with the surface to discolor it or alter its properties. Certain types of plastics become opaque when exposed to amyl acetate and are not suitable for use with that solvent system. In alternative embodiments of the invention, the colloidal nitrocellulose may be suspended in other volatile organic solvents besides amyl acetate before application to a glass or other translucent slide.

The colloidal nitrocellulose slides may be spotted with probes using any known methods for microarray production. Methods for spotting proteins, peptides, oligonucleotides and nucleic acids onto nitrocellulose surfaces are well known in the art. Antibodies and biotinylated bovine serum albumin were used to determine the colloidal nitrocellulose binding capacity. The estimated protein binding capacity for the initial glass matrix arrays was in the range of 100 to 200 µg/cm$^2$.

A CMOS imaging system that detected light emissions through the translucent nitrocellulose matrix arrays was used with a Cy5-streptavidin indicator dye. (See, e.g., U.S. patent application Ser. No. 09/974,089, filed Oct. 1, 2001.) At a loading volume of approximately 5 nanoliters per spot, biotinylated BSA was reproducibly detected at least down to 10 to 20 picograms of protein. Optimal CMOS images were obtained using a protein concentration range of about 20 to 100 µg/mL biotinylated BSA. The CMOS imaging data was confirmed using a 24 hour colloidal gold stain (BioRad, Hercules, Calif.) of the spot arrayed translucent nitrocellulose slides.

The ability of the colloidal nitrocellulose matrix to maintain antibody binding activity was confirmed by spotting a variety of antibodies on the translucent surface. A concentration range of 20 to 200 µg/mL was used. Nonspecific protein binding sites on the nitrocellulose membrane were blocked with 0.1% BSA in buffer solution. The antibodies were then exposed to solutions containing the appropriate target antigen. Binding was detected using biotinylated second antibodies and Cy5-streptavidin indicator.

A 2D array spotted with 5 nanoliters per spot of primary goat anti-mouse antibody solution and was developed using a secondary mouse Listeria monoclonal antibody and a secondary biotinylated goat anti-mouse antibody. In this assay, the primary and secondary goat anti-mouse antibodies bound to different epitopes of the secondary mouse antibody. The two secondary antibodies were thus used to detect primary antibody bound to the array. Using a CMOS imaging system, the primary antibody could be detected down to a level of 100 picograms or less of antibody. The CMOS data was confirmed on the same slides using colloidal gold staining.

An advantage of the translucent nitrocellulose surface is that the progress of the probe binding reaction can be examined by looking through the translucent lower surface of the slide. This allows more effective probe binding to occur. The slide may also be adapted for use with a fluidic cube to mix and deliver samples to the surface. The progress of the probe-target binding reaction may also be monitored in real time through the underside of the slide.

Reconfigurable Microarrays

In certain embodiments of the invention, reconfigurable microarrays may be produced by using small linker molecules, such as aptamers or affibodies, bound to the surface of a solid matrix. Aptamers are oligonucleotides derived by an in vitro evolutionary process called SELEX (e.g., Brody and Gold, *Molecular Biotechnology* 74:5–13, 2000). Aptamers may be produced by known methods (e.g., U.S. Pat. Nos. 5,270,163; 5,567,588; 5,670,637; 5,696,249; 5,843,653) or obtained from commercial sources (e.g, Somalogic, Boulder, Colo.). Aptamers are relatively small molecules on the order of 7 to 50 kDa. Because they are small, stable and not as easily damaged as proteins, they may be bound in higher numbers to the surface of a solid matrix. This effectively amplifies the number of probe reactive sites on the surface of an array.

Affibody® ligands (U.S. Pat. No. 5,831,012) are highly specific affinity proteins that may be designed and used like aptamers. Affibodies may be produced or purchased from commercial sources (Affibody AB, Bromma, Sweden). Aptamers and affibodies may be used in combination with antibodies to increase the functional avidity of translucent or non-translucent solid matrices for probe molecule binding. Increased binding in turn results in an increased signal strength, greater signal-to-noise ratio, more reproducible target molecule detection and greater sensitivity of detection.

Reconfigurable microarrays may be used in combination with two antibodies and a capture probe. The capture probe may be an affibody, aptamer or any other probe capable of binding one of the antibodies. Both antibodies should selectively bind to a target cell, molecule or antigen.

The effectiveness of binding is increased if the capture probe binds to a portion of an antibody characteristic of the IgG class. Such probes would only require a small part of the antibody structure to be present in order to react and bind to an antibody-target complex. Larger targets, such as microbes or cells are covered with numerous antigens that may form very large complexes with antibodies. However, truncated IgG antibody fragments could interact with such large targets and still bind to an aptamer or affibody probe on the slide surface.

Antibodies are most stable in solution and optimal antigen-target molecule binding occurs with antibodies in solution, not attached to a solid matrix. In preferred embodiments of the invention, the two antibodies are allowed to bind to the target in solution. Once target-antibody complexes are formed, the complex can be exposed to aptamer or affibody probe molecules on the reconfigurable matrix array. The probes may bind to a first antibody, while the second antibody may be conjugated to a fluorescent tag or other marker. The tagged complex may then be detected on the surface of the matrix array, using optical detection or any other known detection method.

For example, an aptamer may be tailored to specifically bind to the Fc portion of mouse IgG with high affinity. Samples containing target molecules of interest may be allowed to interact in solution with a mouse antibody specific for an antigen of interest. The sample is mixed with a different biotinylated or otherwise tagged second (non-mouse) antibody that binds to a different epitope on the same antigen. The target antigen bound to the first and second antibodies is exposed to the aptamer microarray. The anti-mouse aptamer affixes the complex to the solid matrix. After extensive washing to remove unbound tagged antibodies, the complex containing tagged antibody that is attached to the matrix array surface is detected.

In some embodiments of the invention, multiple analytes may be simultaneously detected on a reconfigurable microarray. Such multiplex assays require that each second antibody specific for a different target antigen be labeled with a distinguishable label. For example, three different second antibodies may be tagged with red, green or blue fluorophores. Using anti-mouse aptamers, mouse antibodies specific for three different targets may be added to a sample and mixed with the target molecules and second antibodies. After exposure to the aptamer array, the presence of each target may be determined by the presence of red, green or blue fluorophores attached to the matrix. The skilled artisan will realize that the invention is not limited to optically distinguishable fluorophore tags and that any known identifiable tag moieties, such as radioactive, fluorescent, luminescent, enzymatic, etc. may be used. The number of target analytes that may be simultaneously detected is limited only by the number of distinguishable tags that may be attached to the second antibody.

The skilled artisan will realize that many variations on this scheme may be used within the scope of the claimed methods. For example, in alternative embodiments of the invention, a first antibody may be used in conjunction with multiple tagged second antibodies, each of which binds to a different epitope of the target molecule. This may occur, for example, where the available second antibodies are polyclonal antibodies. Alternatively, use of more than one second antibody with affinity for the same antigen may improve the sensitivity of detection. In another alternative, one second antibody may bind to a class of targets (for example, all *E. coli* bacteria) while a second antibody binds to a specific subclass (e.g., *E. coli* strain O157:H7).

In a non-limiting example, the aptamer detection method may be used to detect microbes in a food sample. An aptamer that exhibits high affinity and specific binding for mouse IgG may be obtained. Such aptamers may be rapidly and readily obtained using SELEX. The anti-mouse IgG aptamer may be attached to a slide using standard methods, preferably with a translucent solid matrix. Non-specific binding sites on the matrix may be blocked and the slide washed before testing.

To detect *Listeria monocytogenes*, an IgG mouse anti-*Listeria m.* antibody may be incubated with a food sample of interest at an appropriate concentration (typically 1 to 50 µg/mL). A rabbit (or other non-mouse) biotinylated secondary anti-*Listeria m.* antibody (1 to 50 µg/mL) and incubated for 5 to 30 minutes. The sample with both antibodies may then be applied to the array containing anti-mouse IgG aptamers. After a short interval (approximately 15 minutes) the array may be washed so that only mouse IgG and rabbit biotinylated antibody complexed with *Listeria m.* is retained on the array. A solution of Cy5-strepavidin or other indicator applied to the surface may then reveal the presents or absence of an anti-*Listeria m.* antibody complex affixed to the surface.

A single aptamer with high selectivity for IgG mouse antibodies may be used as a universal extender to capture and detect a variety of microbes. The only requirement would be that the mouse antibody to the microbe or antigen reacts only with the target and the aptamer, while the biotinylated second antibody reacts only with the target and not with the aptamer.

Such an aptamer array is reconfigurable and is dependent only upon the nature of the solutions delivered to its surface. For example, an aptamer array that binds to mouse IgG antibodies may in principal be used to detect any target for which a mouse IgG is available. It is far more cost effective to construct such a reconfigurable array, compared to constructing a series of fixed pattern arrays, each of which may only detect a limited number of targets. Thus, the present invention provides significant cost advantages for use in proteomic and genomic work.

Although the methods disclosed in this section can be used with opaque arrays, it is most effectively used with a translucent matrix where solutions are delivered on one side and examined for reactivity from the opposite side of the array. A fluidic cube attached to the reactive surface can be adjusted to deliver fluids to various parts of the array, allowing the user to determine which test results will be obtained for a given sample.

Aptamers are more stable than antibodies and large proteins. They are also smaller and bind in higher concentrations to reactive surfaces. Thus, aptamer-based systems extend the avidity of an array for target molecules beyond what could be achieved using larger proteins for array binding. Although the present example is presented with regard to aptamers, the skilled artisan will realize that affibodies or other small ligands could be used in the practice of the claimed methods.

Fluorescence Detection

Fluorophores are frequently used to detect the presence or absence of a coupled reaction on a glass surface. Fluorescence detectors measure the intensity of the evanescent wave produced when a fluorophore is excited with a laser or other light source. Typically the laser is used to excite the fluorophore at its absorption peak and the detector is tuned to read the emission signal at a longer emission wavelength, which is characteristic of that particular fluorophore. The shift in wavelength between absorption and emission is referred to as the Stokes shift. Most fluorescence detection methods use fluorophores with a large Stokes shift so that the emission and absorption curves are well separated. With fluorophores that have a small Stokes shift, it is necessary to excite at a shorter wavelength than the optimal peak absorption maximum because of overlap between the emission and absorption curves. The signal emission intensity is reduced and the sensitivity for detecting target molecules is decreased. The need for a large Stokes shift also limits the choices of fluorophores that can be used.

Because the curves for absorption and emission are frequently very near to one another, accurate reading of the emission signal may be complicated. If the distance between the emission and absorption curves is small, it is difficult to separate the light from an emission spectrum from that of the absorption signal. Lasers with a narrow band at the absorption peak are frequently used with filters to cut out all light up to a certain critical point just below the emission spectral curve. By selecting an appropriate long pass filter, band pass filter, or combination of long pass and band pass filters, the emission signal can be observed in a narrow window, eliminating much of the interference from the excitatory light source. Interference from the excitatory light source is also avoided by aligning the detector and apparatus so that the emission signal can be read at a large incident angle to the excitation beam. Although filters eliminate most of the signal from the excitatory light source, they also cut out a significant portion of the evanescent (emitted) signal. Most band pass filters cut out as much as 40 to 50% of the emission signal. Long pass filters may cut an additional 10% of the emission signal.

Fluorescent detection is used in a number of common test methods. DNA hybridization is commonly analyzed in this manner, using an appropriate fluorophore coupled to a set of known oligonucleotides that hybridize to capture oligonucleotides affixed to a slide. Sandwich immunoassays also employ this method of analysis, either using a tagged secondary antibody that binds to a primary antibody, or using a secondary biotinylated antibody and an avidin-fluorophore as the tag. Many variations on this method are well known.

Various other types of light interference may occur in fluorescent detection. Light scatter occurs by reflection of the excitation beam, while light dispersion occurs by reflection and bending of the excitation beam. Scatter and dispersion may represent a large part of the light striking a detector. In general, when a substance (such as a protein, nucleic acid or other biomolecule) is affixed to the surface of a glass slide, it acts as a mirror to reflect and scatter light in a variety of directions. The amount of surface covered and the mass or density of the attached material may greatly affect the amount of scattered light. The chemical composition of proteins, oligonucleotides or polymers attached to the glass surface may also affect the scattered light (see FIG. 1). In addition, the material attached to the glass surface material may itself fluoresce. The glass used may also have surface irregularities that can affect the signals received by the detector. The energy absorbed across the glass may vary from one spot to another, making signal analysis very problematic. Such problems require the use of novel methods of fluorescent detection and/or data analysis.

Evanescent Emission and Scattered Light

Evanescent signals are generally very weak and light scatter is intense, making accurate quantitative detection of analytes problematic. Light scatter is frequently assumed to be eliminated by filters. However, scattered light is almost always present and can be a significant part of the total signal reaching a detector. Filters used to remove light scatter also remove much of the target emission signal, thereby decreasing detector sensitivity. Filters may also transmit a small amount of scattered light. If the scattered light is relatively large compared to the evanescent emitted light, the detected signal will be a combination from several sources, only one of which represents target molecule binding.

The components of light scattering are illustrated in FIG. 1. Two spots (e.g., different antibodies) are deposited on a glass surface. During a method to detect a target, one of the spots remains totally non-reactive. The other spot reacts with a target, such as a bacterial pathogen and/or other reagents. Target binding to the reactive antibody increases the mass attached to the spot and results in a larger surface area and a change in molecular structure at the spot. A mass effect has occurred. The light scatter from the reactive spot will be different from the light scatter before target molecule binding. A sensitive photon-counting detector could detect this difference in scatter. A variety of instruments, such as certain flow cytometers and turbidity meters take advantage of scatter to quantify the amount of material in a solution. Those instruments measure the angle of scatter for a beam of light impinging on a target material. The change in signal is the difference between the reference signal ($S_{ref}$) and signal 2 ($S_2$). In FIG. 1 the $S_2$ signal is shown as having two components, a modified scatter signal plus a mass effect signal of the coupled pathogen. The signal from the reactive spot changes while the signal from the non-reactive spot signal is constant.

$\Delta S$(non-reactive spot)=0

$\Delta S$(reactive spot)=Modified($S_p$)+$M_1$-$S_{ref}$

If the mass effect is sufficient to cause a large scatter effect, the fluorophore used for target detection could be eliminated. For example in DNA hybridization experiments, the mass attached to a surface using standard oligonucleotide probes (about 24 nucleotides in length) may be increased by a factor of 2 or more upon binding of target nucleic acids. Such a large change in mass may be detectable by monitoring light scatter instead of evanescent waves. In the case of a sandwich immunoassay with a biotinylated secondary antibody, another mass effect occurs when the biotinylated antibody binds to the pathogen. A third mass effect occurs when avidin-conjugated fluorophore binds to biotin.

The most sensitive signal may be obtained by subtracting the initial reference signal from the final captured signal, obtained after the fluorophore has been attached and excited. That signal represents the modified accumulated mass effects and the emission signal for the reactive spot.

$\Delta S$(reactive spot)=Modified accumulated mass effects+Emission-$S_{ref}$

This method of analysis can be used with a CMOS imager or any known digital imaging method that allows storage of pixel images for subsequent processing. The signal obtained from each spot will contain more useful information and will show a more intense change upon target binding if a proper subtraction method is used. The scatter effect may be turned to an advantage in detecting target binding. Moreover, it is unnecessary to have fluorophore emission and absorption curves well separated, since spurious signals are subtracted out of the image. The full intensity of an emission signal may be measured without reducing emitted light by with filters.

A subtraction method also eliminates artifacts and defects that may derive, for example, from inhomogeneity (chips, flaws) in the glass slide surface. The non-reactive spots completely blank out and do not appear as a signal.

Because CMOS imagers and pixel capturing devices in general exhibit a random, very low level noise there are limits as to what kinds of signals can be detected. At any given point in time, the baseline reference may exhibit a random number of spikes. A weak signal falling between two spikes would not normally be detected against this background noise.

The signal-to-noise problem may be improved if numerous images are captured and added one upon the other. Because the random spikes inherent in a detector such as a CMOS imager are constantly shifting about, accumulating the frame images will tend to average out the random noise. However a weak signal from the emission of an excited fluorophore does not change its pixel location. Therefore, an accumulated signal caused by target binding will increase with time. This method is similar to taking a photoimage of a distant star or galaxy, by tracking the object as it moves across the sky. The object of interest appears brighter against the background with time because the signal has accumulated at the same spot on the detector, while the background light averages out.

Method of Analysis

In an exemplary embodiment of the invention, a glass slide or other matrix array is secured on a stage. A fluidic cube is attached to the surface of the glass and used to deliver samples, second antibodies and other reagents. Before target molecule binding, an excitatory laser is focused on one end of the glass slide at an inclined angle about 30 to 40 degrees. The glass slide acts as a waveguide to conduct the excitatory light to spots, containing bound primary antibody, on the glass surface. A CMOS imager is used to capture the light signals. The CMOS chip is located beneath the glass slide and is aligned so that spots on the slide are directly above the imager and are sharply focused on the imager surface with optical lenses and apertures. Additional details of a CMOS imaging system and data analysis method of use are disclosed in U.S. patent application Ser. No. 10/373,408, by Lawrence R. Green, entitled "Image Sensor Optimization," filed on Feb. 24, 2003, the entire text of which is incorporated herein by reference.

A number of pictures are taken. Each picture represents a single frame. For example 10 frames are taken using a 50 millisecond exposure. The exposure is selected so that the amount of light captured in a single frame is within the sensitive range for the camera. The 10 digital frames are then added to provide a reference set that is used for subtraction of unwanted (background) signals. The accumulated image is referred to as the calibration slide.

The fluidic cube is used to expose primary antibody to a sample, bind any target molecules to the first antibody, and bind second antibody to the target. The process ends with binding of avidin-fluorophore to the biotinylated second antibody and a final set of washes. The same number of frames used to obtain the reference slide image are taken of the sample slide, using the same exposures. The cumulative set of frames is referred to as the sample slide image. The luminescent signal for each spot is determined by subtracting the reference slide image from the sample slide image. This process essentially eliminates background noise and matrix array artifacts, resulting in very sensitive detection of target molecules.

In alternative embodiments of the invention, pictures may be obtained in either still frame or video mode. A typical video frame runs at 2000 ms and captures 100 frames each for the reference and sample analysis. This method removes artifacts and non-reactive spots, leaving only those signals that represent target molecule binding to the array.

Probe Labels

In various embodiments of the invention, labeled probes may be prepared by any methods known in the art. In certain embodiments, a label moiety may be incorporated into a probe (e.g., peptide, protein, oligonucleotide) during synthesis. In other embodiments of the invention, labels may be attached by covalent, noncovalent, ionic, van der Waals, hydrogen bonding or other forces following probe synthesis. Methods for attaching fluorescent or other labels to probe molecules are known in the art and any such known method may be used to make labeled probes within the scope of the present invention. In particular embodiments of the invention, a probe molecule may be biotinylated and may bind to an avidin or streptavidin-conjugated fluorophore. Fluorophores and conjugated fluorophores may be obtained from commercial sources, such as Molecular Probes, Inc. (Eugene, Oreg.).

Labels of use may comprise any composition detectable by electrical, optical, spectrophotometric, photochemical, biochemical, immunochemical, or chemical techniques. Labels may include, but are not limited to, conducting, luminescent, fluorescent, chemiluminescent, bioluminescent and phosphorescent labels, chromogens, enzymes or substrates. Fluorescent molecules suitable for use as labels include, but are not limited to, dansyl chloride, rhodamineisothiocyanate, Alexa 350, Alexa 430, AMCA, BODIPY 630/650, BODIPY 650/665, BODIPY-FL, BODIPY-R6G, BODIPY-TMR, BODIPY-TRX, Cascade Blue, Cy2, Cy3, Cy5,6-FAM, fluorescein, HEX, 6-JOE, Oregon Green 488, Oregon Green 500, Oregon Green 514, Pacific Blue, REG, Rhodamine Green, Rhodamine Red, ROX, TAMRA, TET, Tetramethylrhodamine, and Texas Red. A variety of other known fluorescent or luminescent labels may be utilized. (See, e.g., U.S. Pat. No. 5,800,992; U.S. Pat. No. 6,319,668.)

All of the COMPOSITIONS, METHODS and APPARATUS disclosed and claimed herein can be made and executed without undue experimentation in light of the present disclosure. While the compositions and methods of this invention have been described in terms of preferred embodiments, it will be apparent to those of skill in the art that variations may be applied to the COMPOSITIONS, METHODS and APPARATUS and in the steps or in the sequence of steps of the methods described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A translucent matrix array comprising:
   a) a substrate;
   b) an optically clear layer of colloidal nitrocellulose coated on the substrate; and
   c) one or more first probes attached to the colloidal nitrocellulose.

2. The translucent matrix array of claim 1, wherein the first probes are attached to the array in spots of about 300 $\mu$m in diameter.

3. The translucent matrix array of claim 2, wherein the probes attached to different spots on the array bind to different targets.

4. The translucent matrix array of claim 1, wherein the first probes are selected from the group consisting of antibodies, antibody fragments, FAb fragments, humanized antibodies, single-chain antibodies, chimeric antibodies, oligonucleotides, polynucleotides, nucleic acids, aptamers and affibodies.

5. The translucent matrix array of claim 1, wherein the substrate is a glass substrate.

6. The translucent matrix array of claim 1, wherein the substrate is a plastic substrate.

7. The translucent matrix array of claim 4, wherein the first probes are aptamers or affibodies.

8. The translucent matrix array of claim 7, wherein the first probes bind to antibodies, antibody fragments, FAb fragments, humanized antibodies, single-chain antibodies or chimeric antibodies.

9. The translucent matrix array of claim 8, wherein the first probes bind to IgG (immunoglobulin type G) antibodies.

10. The translucent matrix array of claim 4, wherein the first probes are antibodies.

11. The translucent matrix array of claim 10, wherein the first probes are anti-mouse antibodies.

12. The translucent matrix array of claim 1, wherein the first probes are attached directly to the nitrocellulose.

13. The translucent matrix array of claim 1, wherein the one or more first probes are capable of binding to one or more targets.

14. The translucent matrix array of claim 13, wherein the one or more targets are selected from the group consisting of a protein, peptide, carbohydrate, polysaccharide, glycoprotein, lipid, hormone, growth factor, cytokine, receptor, antigen, allergen, antibody, substrate, metabolite, cofactor, inhibitor, drug, pharmaceutical, nutrient, toxin, poison, explosive, pesticide, chemical warfare agent, biowarfare agent, biohazardous agent, infectious agent, prion, radioisotope, vitamin, heterocyclic aromatic compound, carcinogen, mutagen, narcotic, amphetamine, barbiturate, hallucinogen, waste product, contaminant, heavy metal, virus, bacterium, *Salmonella, Streptococcus, Legionella, E. coli, Giardia, Cryptosporidium, Rickettsia*, spore, mold, yeast, algae, amoebae, dinoflagellate, unicellular organism, pathogen and cell.

15. The translucent matrix array of claim 13, further comprising an optical detector aligned to detect fluorescent labels attached to the targets.

16. The translucent matrix array of claim 15, wherein the optical detector comprises a CMOS imager.

17. The translucent matrix array of claim 1, wherein the optically clear nitrocellulose layer transmits light signals without scatter or interference.

* * * * *

(12) INTER PARTES REEXAMINATION CERTIFICATE (735th)

United States Patent
Green

(10) Number: US 6,861,251 C1
(45) Certificate Issued: Nov. 12, 2013

(54) TRANSLUCENT SOLID MATRIX ASSAY DEVICE FOR MICROARRAY ANALYSIS

(75) Inventor: Lawrence R. Green, Tacoma, WA (US)

(73) Assignee: PriTest, Inc., Redmond, WA (US)

Reexamination Request:
No. 95/001,426, Aug. 26, 2010

Reexamination Certificate for:
Patent No.: 6,861,251
Issued: Mar. 1, 2005
Appl. No.: 10/373,546
Filed: Feb. 24, 2003

(51) Int. Cl.
*B01J 19/00* (2006.01)
*B82Y 30/00* (2011.01)
*C40B 50/14* (2006.01)

(52) U.S. Cl.
CPC ............. *B01J 19/0046* (2013.01); *B82Y 30/00* (2013.01); *C40B 50/14* (2013.01); *B01J 2219/00315* (2013.01)
USPC ....... 506/39; 356/317; 435/287.2; 435/288.7; 435/5; 435/6.19; 435/7.1; 436/527; 436/530

(58) Field of Classification Search
None
See application file for complete search history.

(56) References Cited

To view the complete listing of prior art documents cited during the proceeding for Reexamination Control Number 95/001,426, please refer to the USPTO's public Patent Application Information Retrieval (PAIR) system under the Display References tab.

*Primary Examiner* — Shri Ponnaluri

(57) ABSTRACT

The present invention concerns methods and compositions relating to matrix arrays. In certain embodiments, the arrays are translucent. In other embodiments, the arrays are reconfigurable. In preferred embodiments, the arrays are translucent and reconfigurable. Reconfigurable arrays may be produced using small linker molecules, such as aptamers or affibodies, attached to the array substrate. Preferably, the small linker molecules bind to an IgG specific portion of antibodies. Such arrays may be used to detect any target that binds selectively or specifically to an IgG, allowing great flexibility of use. Translucent matrix arrays may utilize a translucent, colloidal form of nitrocellulose to coat the array substrate.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-17 are cancelled.

\* \* \* \* \*